(12) United States Patent
Meholic

(10) Patent No.: US 6,516,605 B1
(45) Date of Patent: Feb. 11, 2003

(54) PULSE DETONATION AEROSPIKE ENGINE

(75) Inventor: Gregory Vincent Meholic, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/882,649

(22) Filed: Jun. 15, 2001

(51) Int. Cl.⁷ .............................................. F02K 7/075
(52) U.S. Cl. ....................................................... 60/247
(58) Field of Search .............................. 60/247; 244/74

(56) References Cited

U.S. PATENT DOCUMENTS

| | | | | |
|---|---|---|---|---|
| 2,633,699 A | * | 4/1953 | Goddard | 244/74 |
| 3,112,612 A | * | 12/1963 | Adamson | 239/265.25 |
| 3,161,378 A | * | 12/1964 | Creasey | 244/53 B |
| 4,938,112 A | * | 7/1990 | Hertzberg et al. | 60/768 |

OTHER PUBLICATIONS

T.E. Bratkovich et al., An Introduction to Pulse Detonation Rocket Engines(PDREs), 33$^{rd}$ AIAA/ASME/SAE/ASEE Joint Propulsion Conference and Exhibit, Seattle, WA, Jul. 6–9, 1997, AIAA 97–2742.*

Meholic, G., An Overview of Detonation Propulsion and Applications, Abstract for 11$^{th}$ Annual Advanced Propulsion Workshop, May 31–Jun. 2, 2000.*

* cited by examiner

Primary Examiner—Ehud Gartenberg
(74) Attorney, Agent, or Firm—Rodney M. Young; Pierce Atwood

(57) ABSTRACT

An aerospike engine has at least one nozzle surface and a plurality of pulse detonation devices mounted to the nozzle surface in place of the more common deflagration-based combustors. Each pulse detonation device is oriented such that its combustion products are directed along the nozzle surface Incorporating pulse detonation devices into the aerospike engine produces the advantage of a more efficient thermodynamic cycle. The pulse detonation aerospike engine is also capable of operating on either air or oxidizer.

15 Claims, 3 Drawing Sheets

PULSE DETONATION AEROSPIKE ENGINE

BACKGROUND OF THE INVENTION

This invention relates generally to aerospike engines and more particularly to aerospike engines having pulse detonation devices.

In a conventional rocket engine, fuel and oxidizer are pumped to a combustion chamber under extremely high pressure and burned to create a propulsive gas. This gas is exhausted through a nozzle, typically referred to as a de Laval or bell nozzle, which accelerates the gases to create propulsive thrust. As the vehicle powered by the rocket engine climbs, the exhaust plume expands outside the bell nozzle due to decreasing atmospheric pressure. Because the bell nozzle has a fixed geometry, it cannot adequately adapt to changing backpressure as the vehicle ascends through the atmosphere. Eventually, the nozzle becomes "underexpanded," resulting in propulsive efficiency losses.

An alternative approach is a linear aerospike engine, which uses two sloped nozzle surfaces in place of a conventional bell nozzle. The nozzle surfaces are open to the atmosphere and arranged in a V-shaped configuration. A series of small, independent combustion chambers is located along the upper edge of each of the nozzle surfaces. The combustion chambers are oriented such that hot exhaust gases are directed almost parallel to the nozzle surfaces to produce thrust. Unlike a bell nozzle, the exhaust plume from an aerospike nozzle surface is open on one side and thus free to expand. The open exhaust plume compensates for decreasing atmospheric pressure as the vehicle climbs and maintains optimum engine efficiency regardless of altitude and atmospheric pressure. With the combustor chambers mounted in rows along the width of the engine, steering a vehicle can be achieved by selectively throttling particular sets of the combustion chambers. For instance, throttling either the upper or lower row in a horizontally mounted engine will result in asymmetric thrust on one side of the vehicle and thus control pitch. Throttling either the left or right sides of both rows will control yaw.

Current aerospike engines rely on deflagration combustion systems whereby the combustion effects occur at relatively slow rates (i.e., less than the speed of sound within the combustible mixture) and at constant pressure. Detonation combustion, however, occurs at rates well in excess of the speed of sound and simultaneously provides a significant pressure rise. Because of the efficient thermodynamic cycle, it would be advantageous to implement aerospike engines with detonation-based propulsive devices.

BRIEF SUMMARY OF THE INVENTION

The above-mentioned need is met by the present invention, which provides an aerospike engine having at least one nozzle surface and a plurality of pulse detonation devices mounted to the nozzle surface. Each pulse detonation device is oriented such that its combustion products a directed along the nozzle surface.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
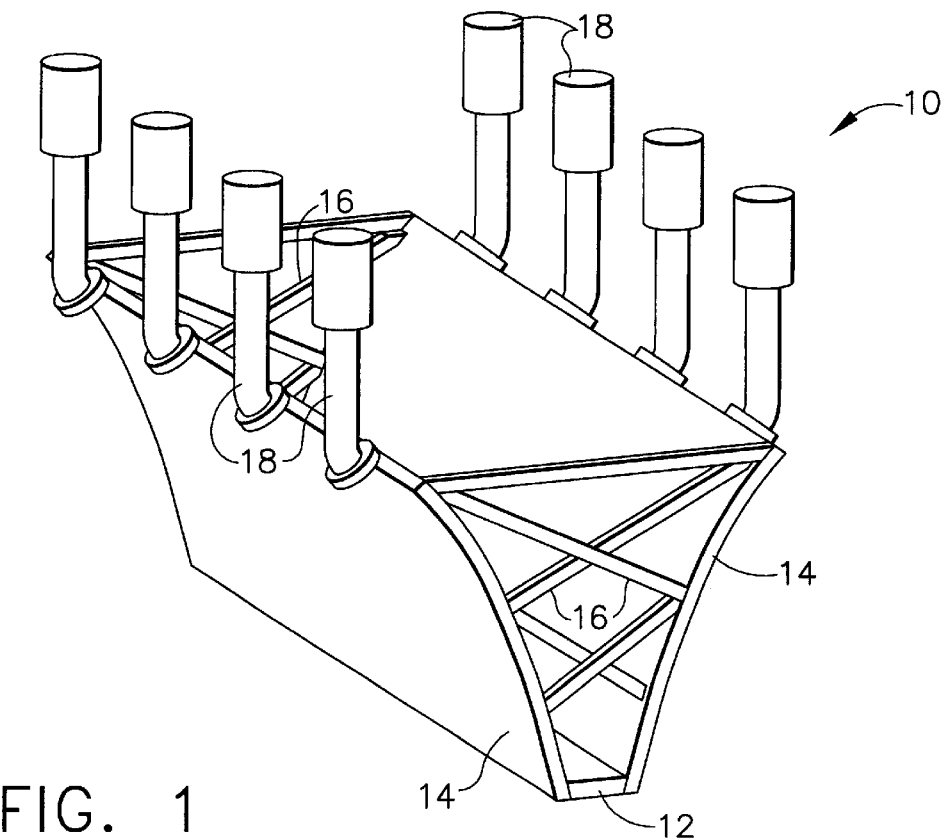
FIG. 1 is a perspective view of a linear aerospike engine utilizing pulse detonation devices.
Figure 2:
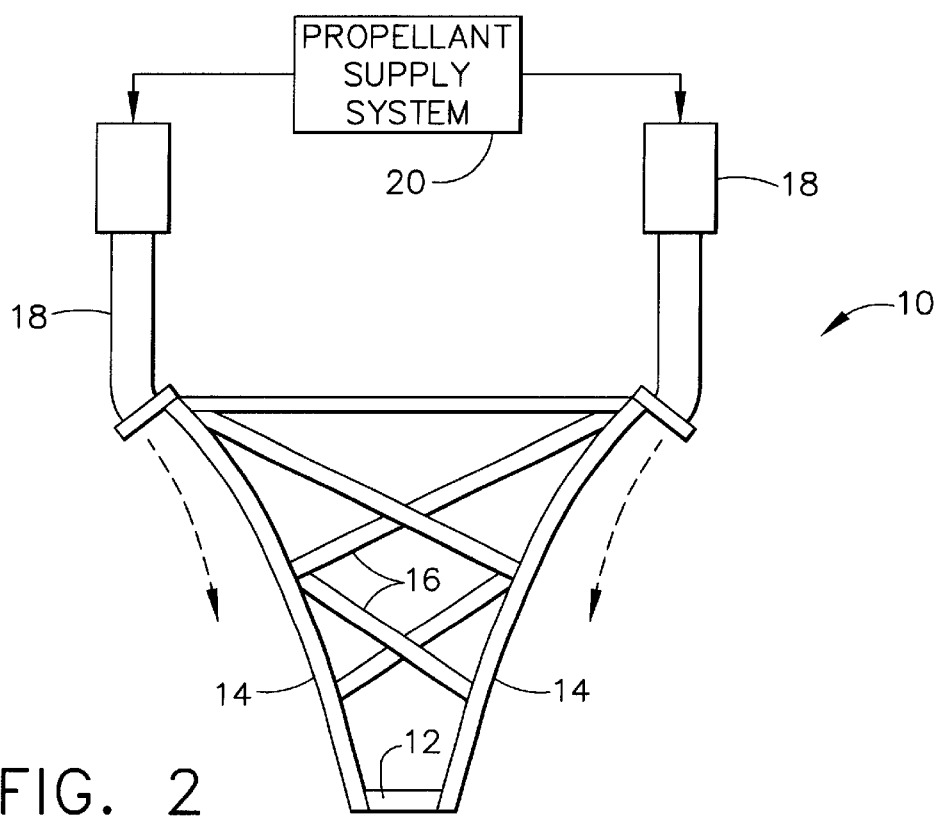
FIG. 2 is an end view of the linear aerospike engine of FIG. 1.

Referring to the drawings wherein identical reference numerals denote the same elements throughout the various views, FIGS. 1 and 2 show a linear aerospike engine 10 having a flat, rectangular-shaped base 12 and two nozzle surfaces 14 disposed on opposite sides of the base 12. The nozzle surfaces 14 are elongated panel members that extend lengthwise along the base 12. Each nozzle surface 14 is attached along its lower edge to a respective side of the base 12 and extends upward and outward from the base 12 to define a substantially V-shaped configuration. The nozzle surfaces 14 have a curvature that resembles one-half of a conventional bell nozzle and are open to the atmosphere. A number of support trusses 16 extend between the two nozzle surfaces 14 to provide structural integrity to the engine 10.

The aerospike engine 10 further includes a plurality of pulse detonation devices 18. The pulse detonation devices 18 use an intermittent combustion process to create a temperature and pressure rise by detonating a flammable mixture. Most internal combustion engines currently used for propulsion rely on deflagration combustion whereby the combustion effects occur at relatively slow rates (i.e., less than the speed of sound within the combustible mixture) and at constant pressure. Detonation combustion, however, occurs at rates well in excess of the speed of sound and simultaneously provides a significant pressure rise. In operation, a charge of a flammable mixture is fed into the pulse detonation device 18 and detonated. The resulting combustion products are expelled out of an open end of the device, creating a pulse of thrust.

A propellant supply system 20 (FIG. 2) for delivering the flammable mixture to the pulse detonation devices 18 is provided. As will be described in more detail below, the pulse detonation devices 18 can be configured such that detonation can occur with either air or an oxidizer, such as liquid oxygen, depending on the flight environment of the engine. Thus, the propellant can be either a mixture of fuel and oxidizer or fuel and air. The propellant supply system 20 includes pumps and associated piping for supplying the pulse detonation devices 18 with fuel and oxidizer from their respective storage tanks. Valves for metering and controlling the delivery of fuel and oxidizer are also included. In addition, means for introducing ambient air into the propellant supply system 20 are provided. Many such means are known in the combustion art.

A group of the pulse detonation devices 18 is mounted on the upper outside edge of each nozzle surface 14. The pulse detonation devices 18 are oriented with respect to the nozzle surfaces 14 such that the combustion products are directed along the nozzle surfaces. Thus, each exhaust plume is bounded by a nozzle surface 14 on one side and is free to expand to the atmosphere on the other side, instead of being confined as in a conventional rocket engine having a bell nozzle. The freely expanding exhaust plumes compensate for decreasing atmospheric pressure as the vehicle climbs and optimizes engine efficiency throughout the flight.

Figure 3:
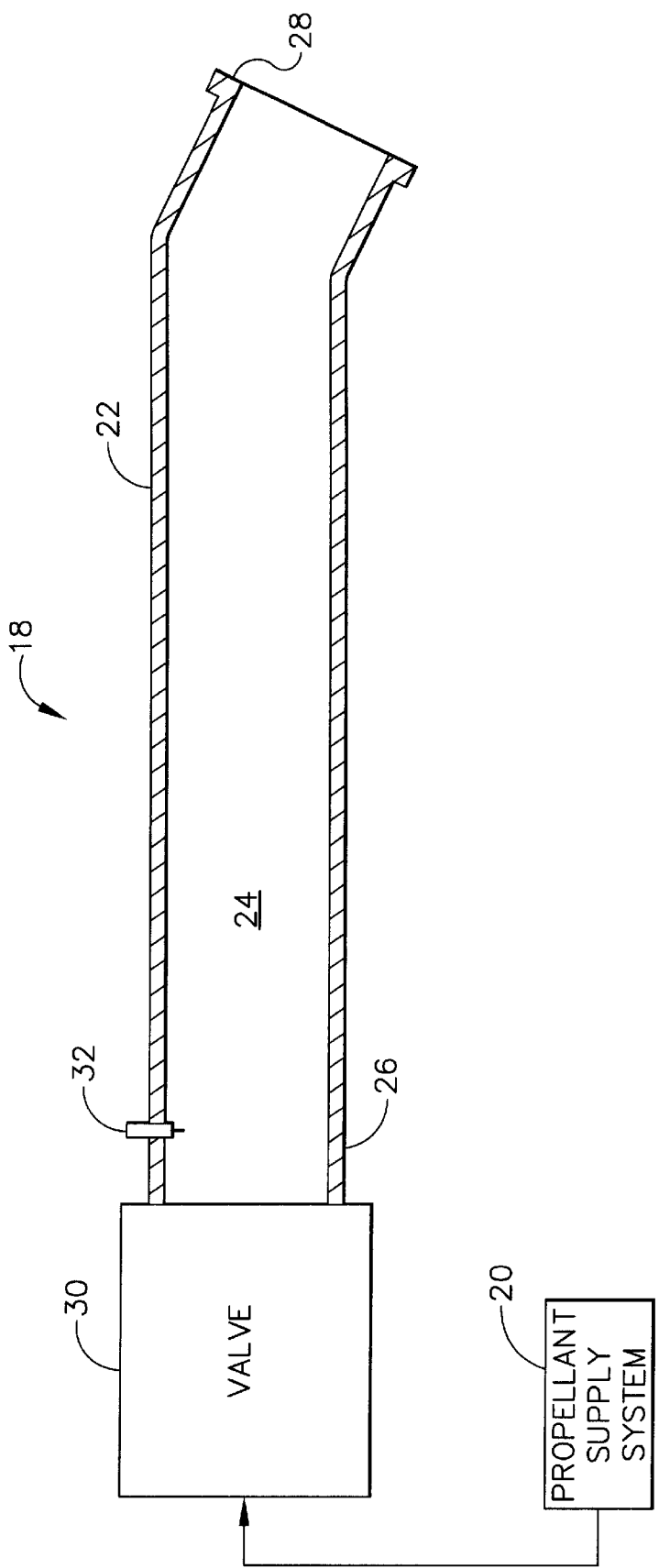
FIG. 3 is a cross-sectional view of one embodiment of a pulse detonation device.

Referring to FIG. 3, one possible embodiment for a pulse detonation device 18 is shown. The pulse detonation device 18 includes a tube 22 having a prescribed length and defining an internal combustion chamber 24. The tube 22 has a forward end 26 and an open aft end 28, which is located adjacent to the corresponding nozzle surface. A valve 30 is mounted to the forward end 26 and operates to intermittently introduce a flammable mixture into the combustion chamber 24. The valve 30 can be any type of valve suitable for controlling the flow of flammable mixture into the tube 22 and containing the detonation therein. To this end, the valve 30 is connected to the propellant supply system 20.

An igniter 32 is provided in the tube 22 adjacent to the valve 30. The igniter 32 produces sufficient energy to detonate the flammable mixture in the combustion chamber 24. The region of the combustion chamber 24 in the immediate vicinity of the igniter 32 is referred to herein as the detonation zone. Detonation combustion depends on the pressure, temperature and equivalence ratio of the flammable mixture, as well as the amount of energy released to start ignition. By locating the igniter 32, and hence the detonation zone, closer to the forward end 26 than the aft end 28, a larger portion of the tube length is devoted to generating thrust. The overall length of the tube 22 will depend on the desired operating frequency of each pulse detonation device 18.

Operation of the pulse detonation device 18 is initiated by causing the valve 30 to repeatedly open and close at a predetermined frequency. Every time the valve 30 opens, a charge of the flammable mixture is introduced into the combustion chamber 24. When the valve 30 closes, the igniter 32 is activated to detonate the flammable mixture in the combustion chamber 24.

Upon detonation of the flammable mixture, detonation waves will propagate in both the forward and aft directions. The forward wave will be reflected by the valve 30, which will have assumed its closed position. The aft wave travels downstream from the detonation zone through the generally longer aft portion of the tube 22, consuming the flammable mixture along the way. As the aft pressure wave, which is a compression wave, accelerates through the combustion chamber 24, it raises both temperature and pressure. When the aft wave reaches the aft end 28 of the tube 22, the hot, high pressure combustion products are expelled out of the open aft end, creating a pulse of thrust. The aft pressure wave is then reflected at the aft end 28 as an expansion wave that propagates forward back through the tube 22. The expansion wave lowers pressure in the combustion chamber 24 and further evacuates the tube 22. At the point when the chamber pressure is at its lowest, the valve 30 re-opens and a fresh charge of flammable mixture is drawn into the combustion chamber 24, readying the pulse detonation device 18 for the next cycle. It is generally desirable to generate pulses at a high frequency to produce smooth, nearly steady state propulsion.

It should be noted that the foregoing is a description of just one possible embodiment of a pulse detonation device that can be used in the present invention, and the present invention is not limited to this particular configuration. Indeed, the present invention is intended to cover the application of any pulse detonation configuration to an aerospike engine.

There are many propulsive and vehicle integration advantages to incorporating pulse detonation devices into an aerospike engine. Since pulse detonation devices produce substantial amounts of static thrust, the aerospike engine 10 could be used for vehicle take off and climb within the atmosphere while operating on a mixture of fuel and air. Once a certain altitude is reached, the pulse detonation devices 18 could be switched over to operate on a mixture of fuel and oxidizer. Because of the difference in densities between air and oxidizer, some change in the geometry of the pulse detonation devices may be required during the switch. This geometry change could be accomplished by mechanically adjusting either the tube diameter or length.

A primary vehicle integration benefit to operating on air at lower altitudes is that there only needs to be enough oxidizer to carry the vehicle from the upper atmosphere into space instead of from the earth's surface. Upon return from space, the vehicle would re-enter the atmosphere just as a typical spacecraft does. The engine 10 would then convert back to the air-breathing mode to provide a safer, powered landing or flight to another destination. This concept provides a true endo/exo-atmospheric engine using a common fuel (such as hydrogen or a JP-series fuel) for atmospheric and space use.

Another advantage results from the fact that the detonation combustion process is more thermally efficient than deflagration. Thus, less fuel is needed for a mission or flight as compared to the amount that would be required with conventional burners. This results in a high specific impulse with a decrease in fuel pump size and weight.

Figure 4:
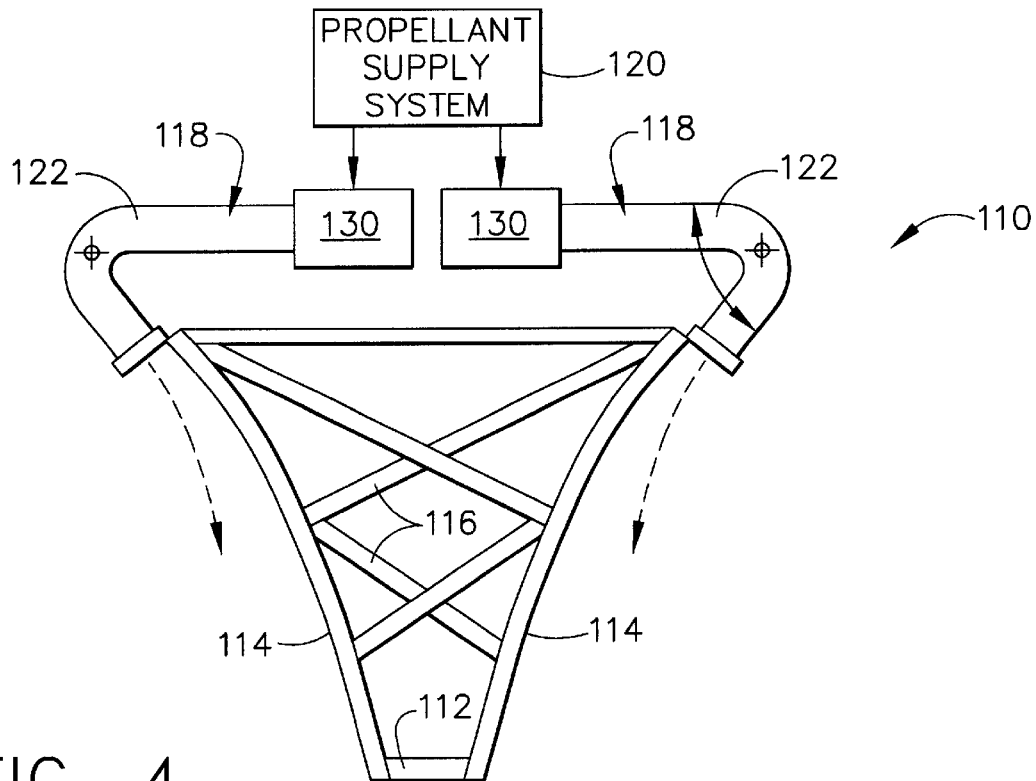
FIG. 4 is an end view of an alternative embodiment of a linear aerospike engine configured in a first operating mode.
Figure 5:
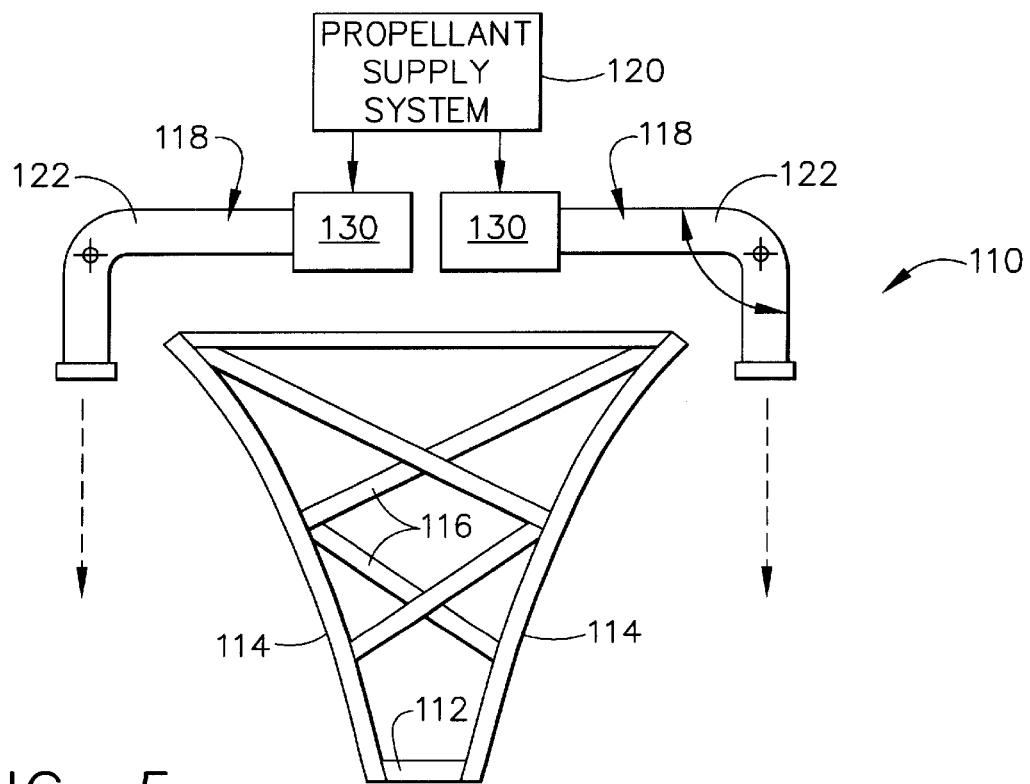
FIG. 5 is another end view of the alternative embodiment of a linear aerospike engine configured in a second operating mode.

Turning now to FIGS. 4 and 5, an alternative embodiment of a linear aerospike engine 110 is shown. Like the first embodiment, the aerospike engine 110 comprises a flat, rectangular-shaped base 112 and two curved, open nozzle surfaces 114 disposed on opposite sides of the base 12 in a substantially V-shaped configuration. A number of support trusses 116 extend between the two nozzle surfaces 114 to provide structural integrity to the engine 110.

The aerospike engine 110 further includes a plurality of pulse detonation devices 118 mounted on the upper outside edge of each nozzle surface 114. Propellant is supplied to the pulse detonation devices 118 by a propellant supply system 120. As is the first embodiment, the propellant supply system 120 includes pumps, piping, valves and the like for delivering fuel and either oxidizer or air to the pulse detonation devices 118.

The pulse detonation devices 118 operate in a similar manner to the pulse detonation devices described above in connection with the first embodiment, but are configured somewhat differently. In this embodiment, each pulse detonation device 118 includes a tube 122 having a prescribed length and defining an internal combustion chamber. A valve 130 is mounted to a first end of the tube 122 and operates to intermittently introduce a flammable mixture into the tube's combustion chamber. The other end of the tube 122 is open. The valve 130, which can be any type of valve suitable for controlling the flow of flammable mixture into the tube 122 and containing the detonation therein, is connected to the propellant supply system 120. An igniter (not shown in FIGS. 4 and 5) is provided in the tube 122 to detonate the flammable mixture in the tube 122.

The valve end of the tube 122 is located above the nozzle surfaces 114, and a substantial portion of the tube 122 lies parallel to the plane defined by the top edges of the nozzle surfaces 114, thereby reducing the overall engine height. The tube 122 is bent at an elbow located near the open end such that open end is generally directed toward the corresponding nozzle surface 114. The tube 122 is pivotable at the elbow so that the angle of the open end can be adjusted with respect to the nozzle surface 114. With this arrangement, the engine 110 is able to operate in two modes. In a high altitude, rocket mode, the tube open ends can be oriented to direct the combustion products along the nozzle surfaces 114 (as shown in FIG. 4). Because the nozzle surfaces 114 are open on one side, the exhaust plumes generated by the pulse detonation devices 118 are free to expand regardless of the atmospheric pressure. In low altitude mode, use of the nozzle surfaces 114 may not be necessary and the tube open ends can be oriented such that the thrust vector leaving the tubes 122 would be parallel to the direction of flight (as shown in FIG. 5).

The aerospike engine 110 can be operated in the mode shown in FIG. 5 for vehicle take off and climb within the atmosphere while operating on a flammable mixture of fuel and air. Once a certain altitude is reached, the pulse detonation devices 118 could be switched over to operate on fuel and oxidizer and in the mode shown in FIG. 4.

While a linear aerospike engine is described herein, it should be understood that the present invention applies to other configurations as well. For instance, an aerospike having an axisymmetric or annular configuration is also possible. In this case, a single nozzle surface in the form of an appropriately contoured cylindrical member would be used. Pulse detonation devices would be mounted around the upper circumferential edge of the cylindrical member and oriented toward the outer surface thereof.

The foregoing has described aerospike engines using pulse detonation devices for propulsion units. While specific embodiments of the present invention have been described, it will be apparent to those skilled in the art that various modifications thereto can be made without departing from the spirit and scope of the invention as defined in the appended claims.

What is claimed is:

1. An aerospike engine comprising:
   at least one nozzle surface; and
   a plurality of pulse detonation devices mounted to said nozzle surface, each pulse detonation device is oriented such that its combustion products are directed along said nozzle surface.

2. The aerospike engine of claim 1 further comprising means for delivering a flammable mixture to said pulse detonation devices.

3. The aerospike engine of claim 2 wherein said flammable mixture comprises fuel and an oxidizer.

4. The aerospike engine of claim 2 wherein said flammable mixture comprises fuel and air.

5. The aerospike engine of claim 2 wherein each pulse detonation device comprises a tube having a first end and an open second end and a valve mounted to said first end, said valve being connected to said means for delivering a flammable mixture.

6. The aerospike engine of claim 5 wherein each pulse detonation device further comprises an igniter disposed in said tube.

7. The aerospike engine of claim 5 wherein said open end of each pulse detonation device is located adjacent to said nozzle surface.

8. The aerospike engine of claim 5 wherein each tube has a pivotable elbow formed therein so that the angle of said open end with respect to said nozzle surface is adjustable.

9. An aerospike engine comprising:
   a base;
   first and second nozzle surfaces attached to respective sides of said base and extending therefrom to define a substantially V-shaped configuration;
   a first group of pulse detonation devices mounted along an upper edge of said first nozzle surface, each one of said first group of pulse detonation devices being oriented such that its combustion products are directed along said first nozzle surface;
   a second group of pulse detonation devices mounted along an upper edge of said second nozzle surface, each one of said second group of pulse detonation devices being oriented such that its combustion products are directed along said second nozzle surface; and
   means for delivering a flammable mixture to said first and second groups of pulse detonation devices.

10. The aerospike engine of claim 9 wherein said flammable mixture comprises fuel and an oxidizer.

11. The aerospike engine of claim 9 wherein said flammable mixture comprises fuel and air.

12. The aerospike engine of claim 9 wherein each pulse detonation device comprises a tube having a first end and an open second end and a valve mounted to said first end, said valve being connected to said means for delivering a flammable mixture.

13. The aerospike engine of claim 12 wherein each pulse detonation device further comprises an igniter disposed in said tube.

14. The aerospike engine of claim 12 wherein each one of said pulse detonation devices of said first group has its open end located adjacent to said first nozzle surface, and each one of said pulse detonation devices of said second group has its open end located adjacent to said second nozzle surface.

15. The aerospike engine of claim 12 wherein a portion of each tube lies parallel to a plane defined by said upper edges of said first and second nozzle surfaces, and each tube has a pivotable elbow formed therein so that the angle of said open end with respect to its corresponding nozzle surface is adjustable.

* * * * *